Dec. 19, 1933.     J. R. GRUETTER     1,940,647
BOTTLE HANDLING APPARATUS
Filed Aug. 28, 1930     14 Sheets-Sheet 1
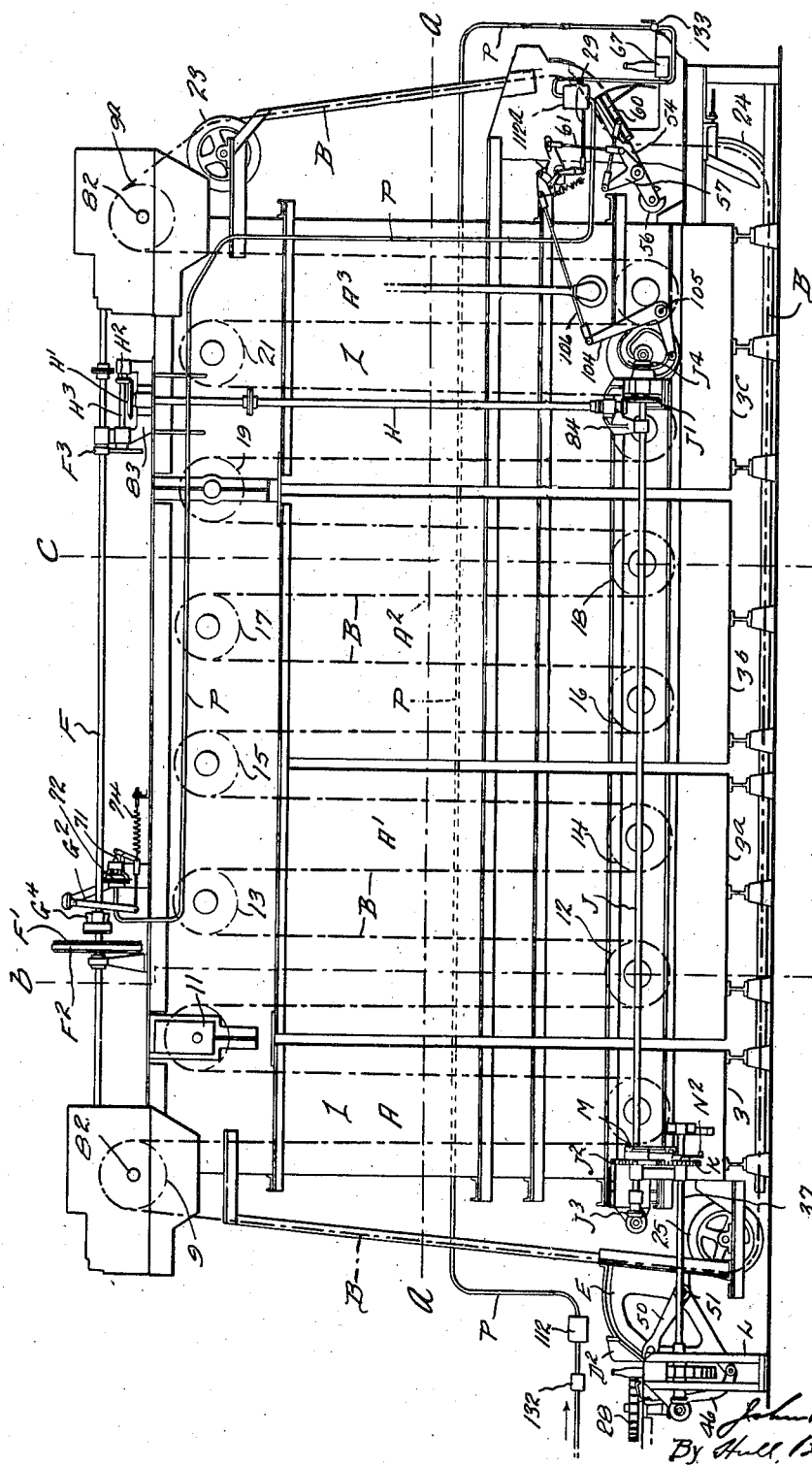
Inventor
John R. Gruetter
By Hull, Brock & West
Attys.

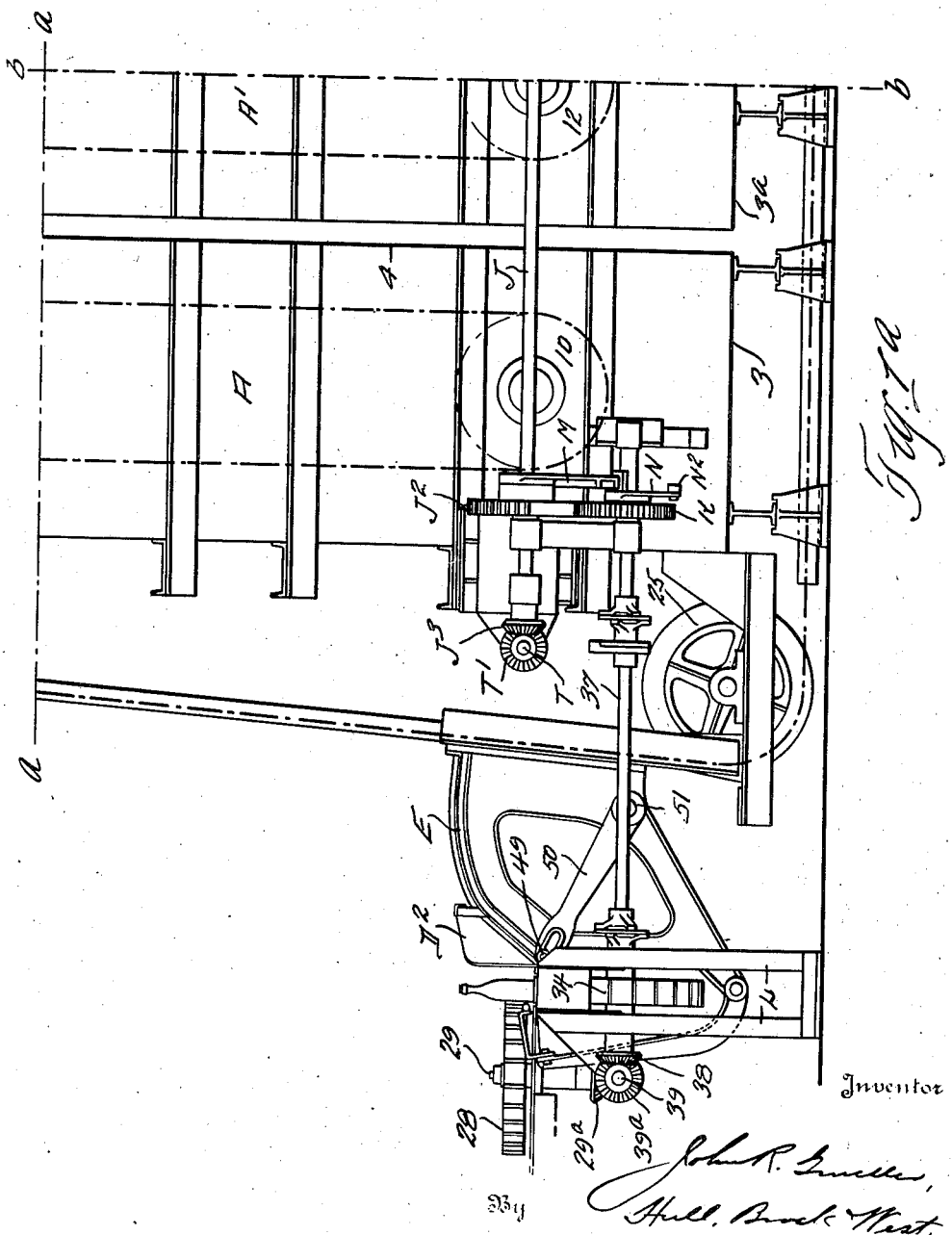

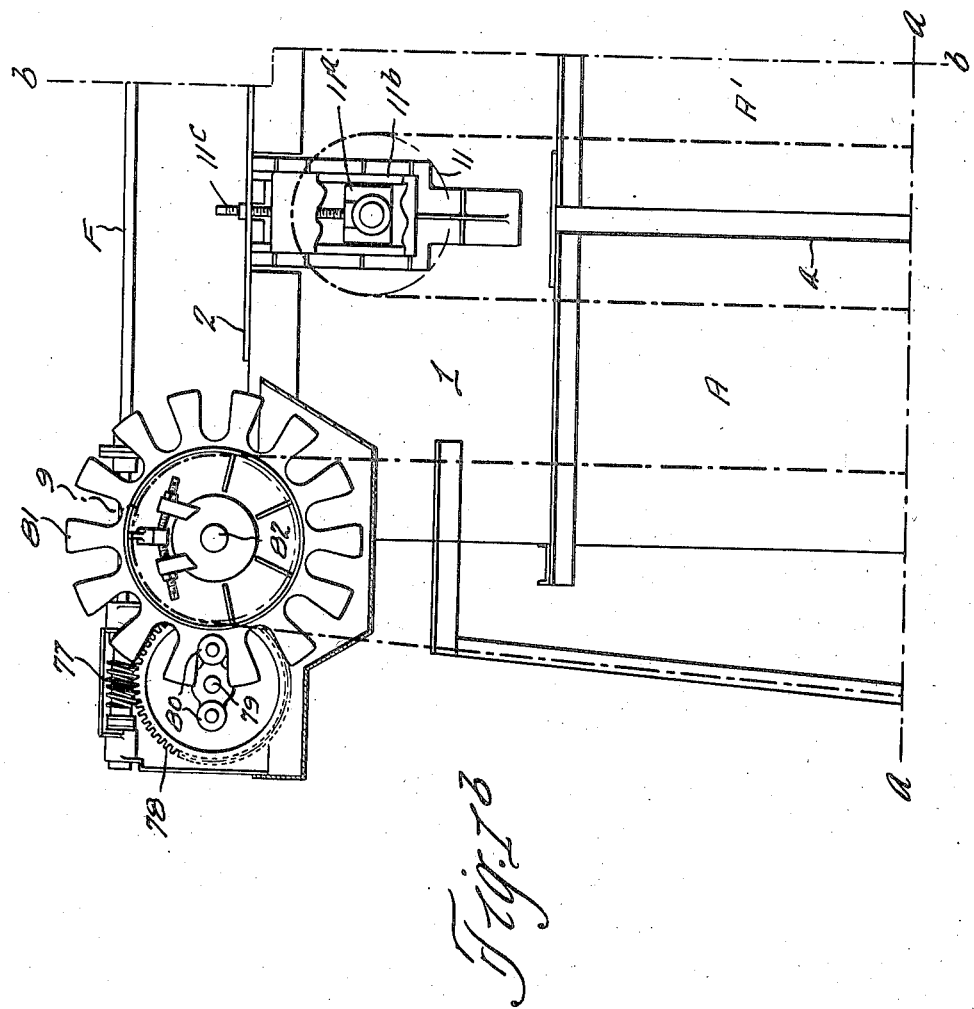

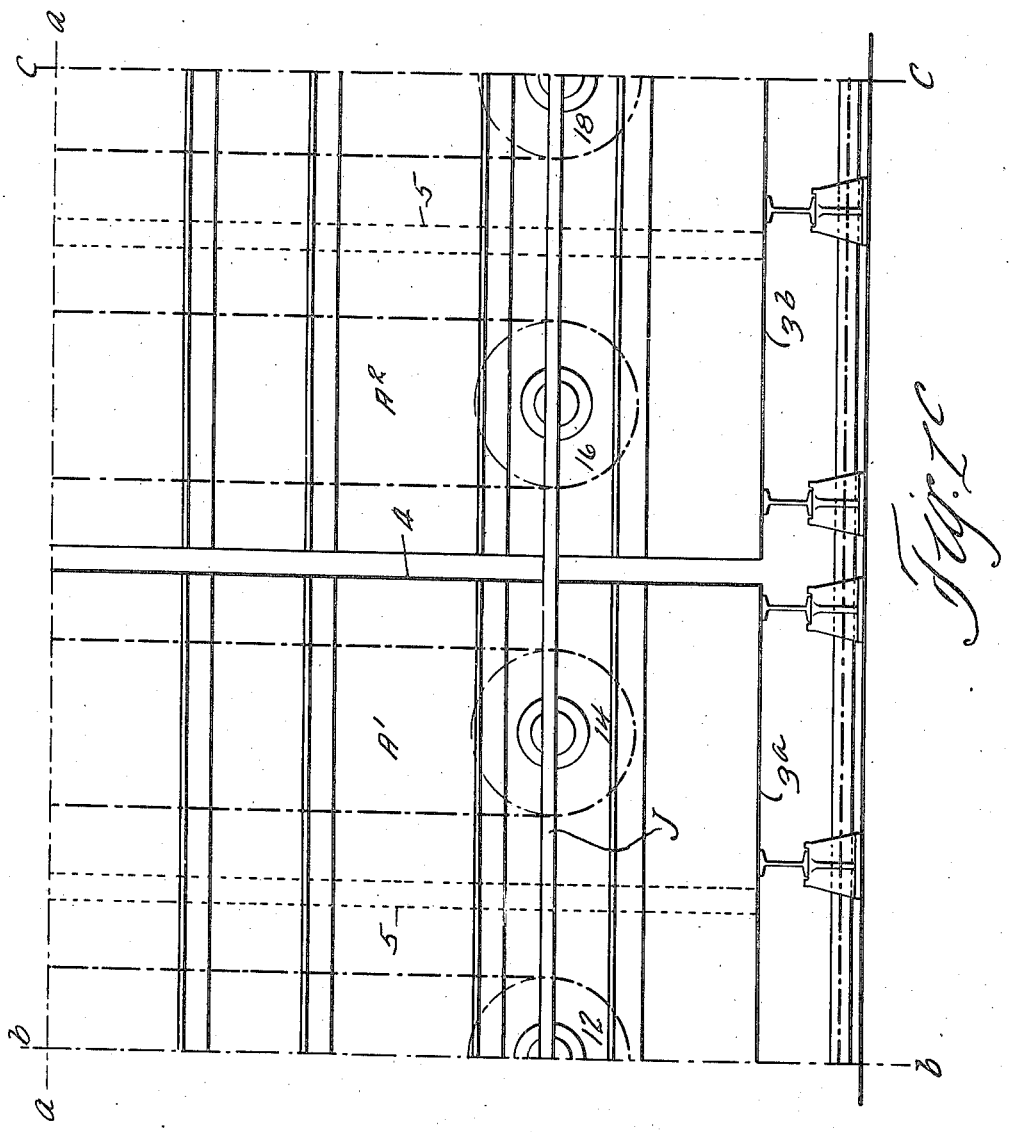

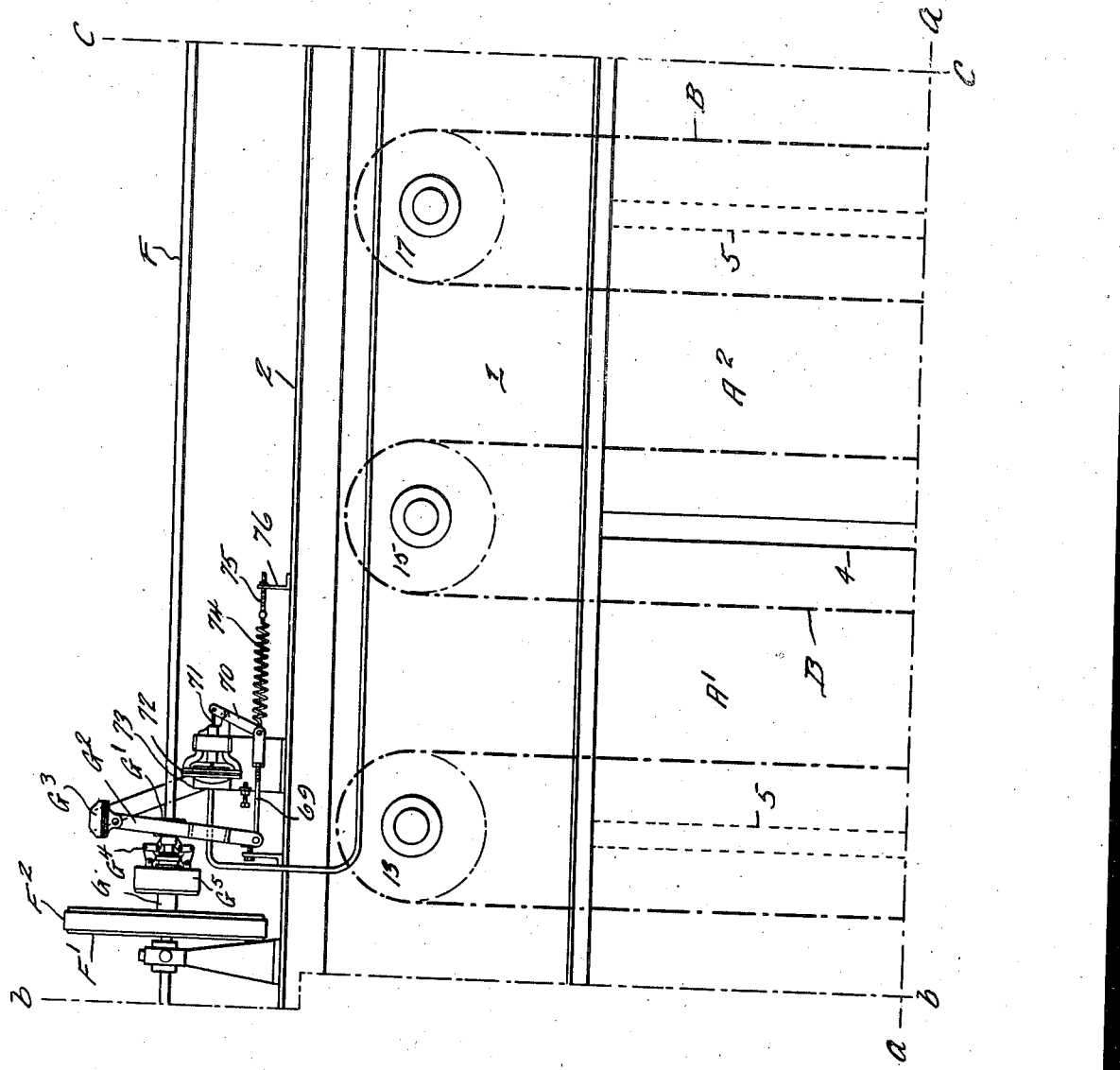

Dec. 19, 1933.                J. R. GRUETTER                 1,940,647
                        BOTTLE HANDLING APPARATUS
                         Filed Aug. 28, 1930        14 Sheets-Sheet 6
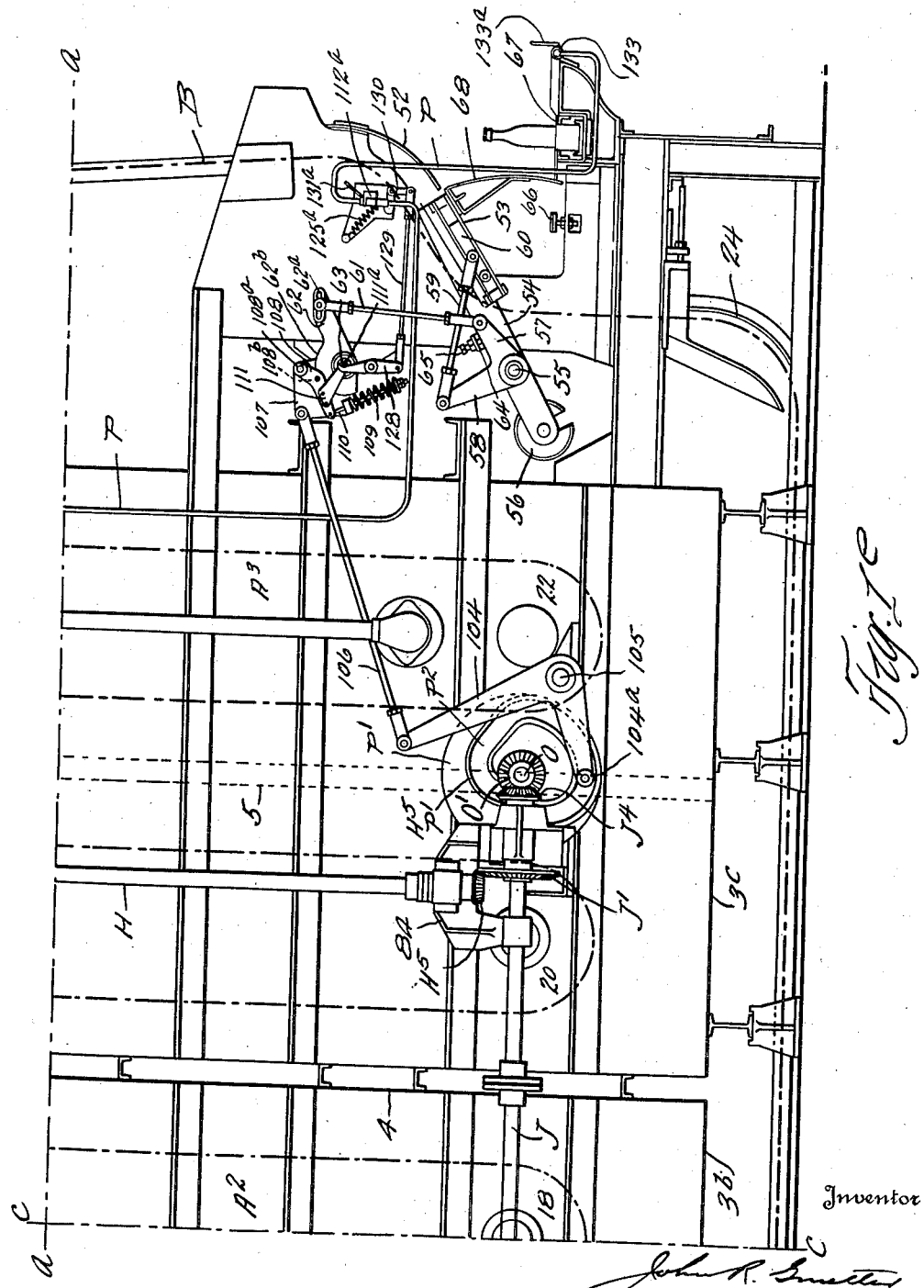
Inventor
John R. Gruetter
By Hull, Brock West,
Attorneys

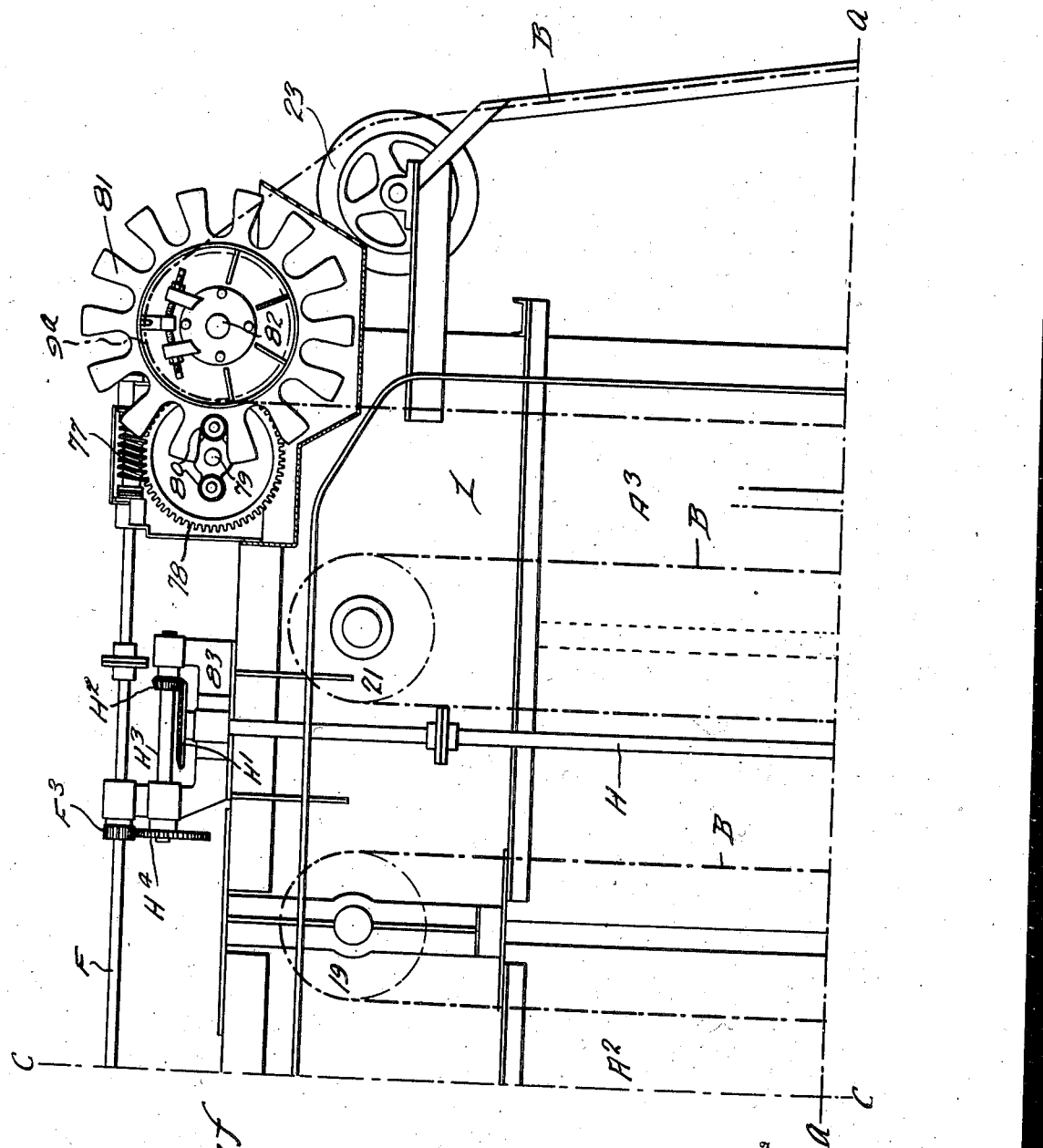

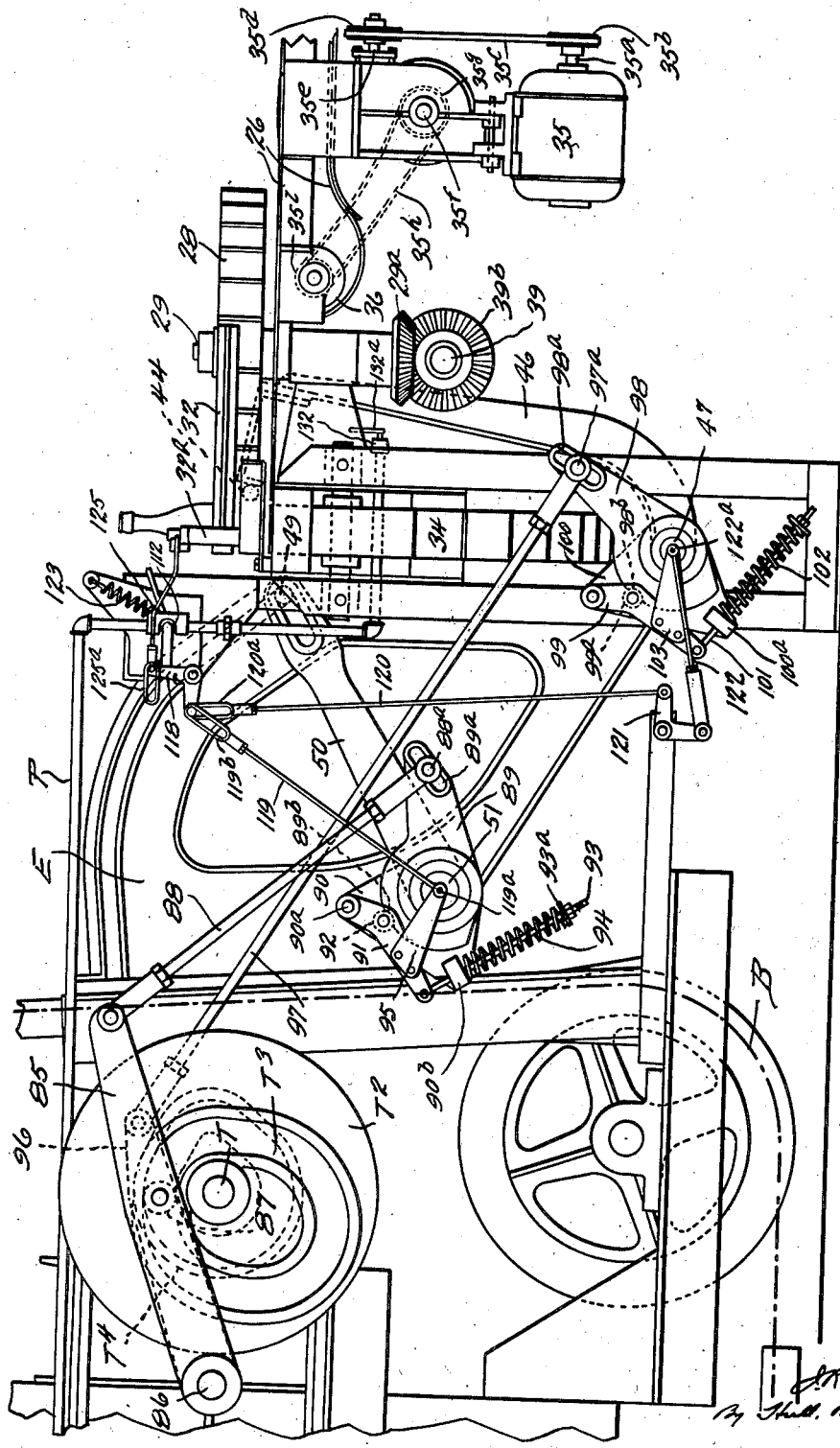

Dec. 19, 1933.  J. R. GRUETTER  1,940,647
BOTTLE HANDLING APPARATUS
Filed Aug. 28, 1930  14 Sheets-Sheet 9
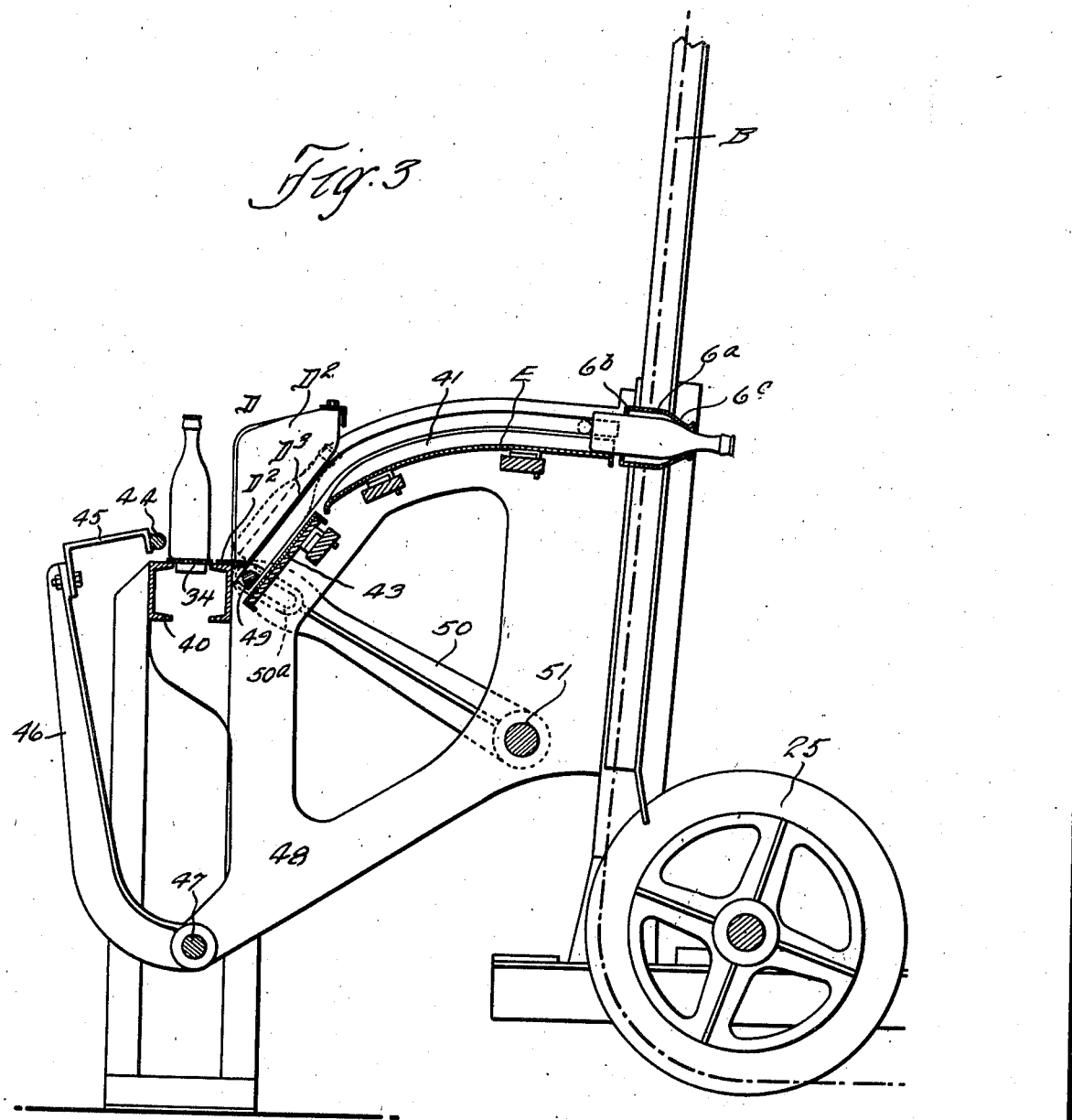

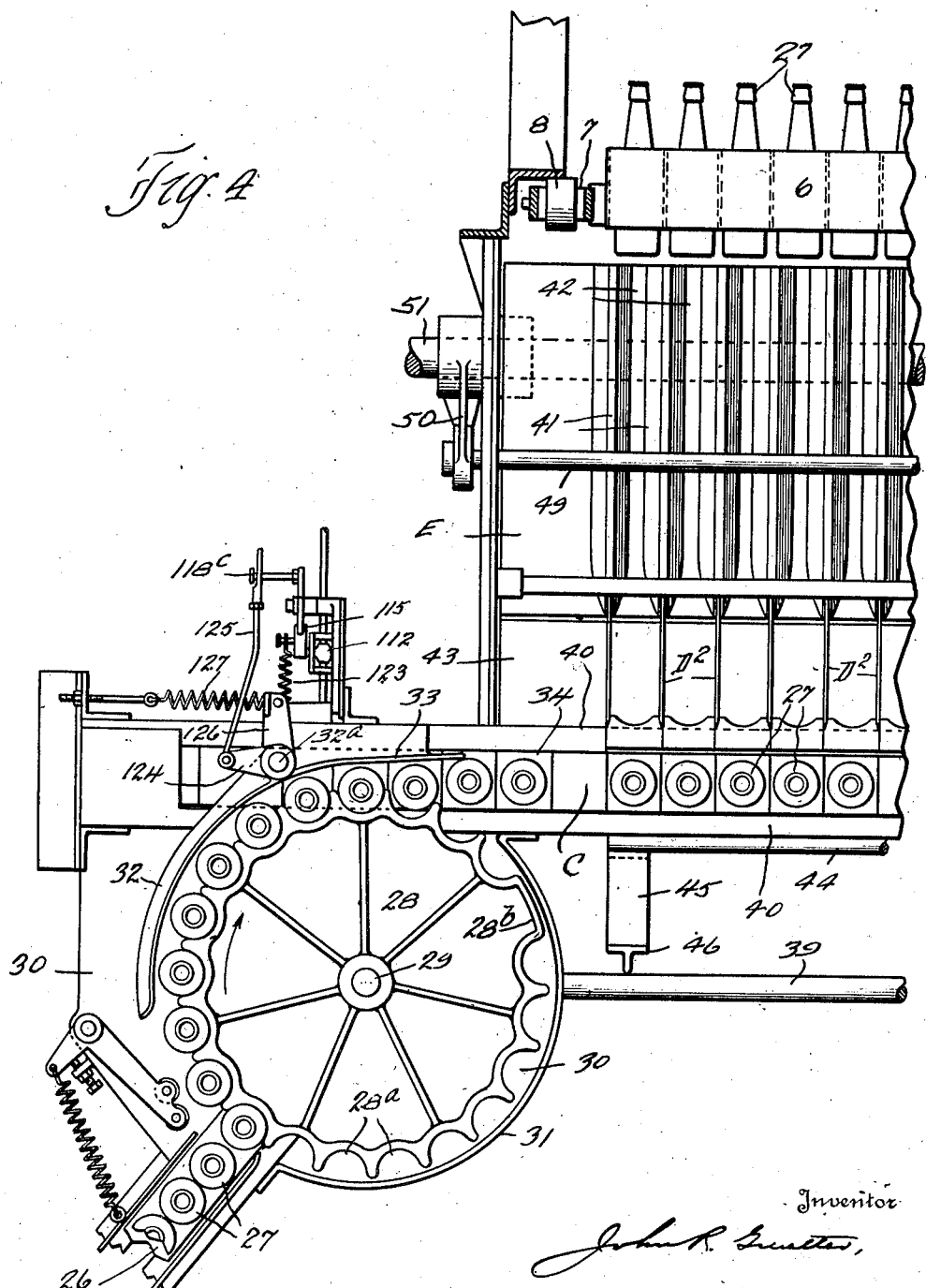

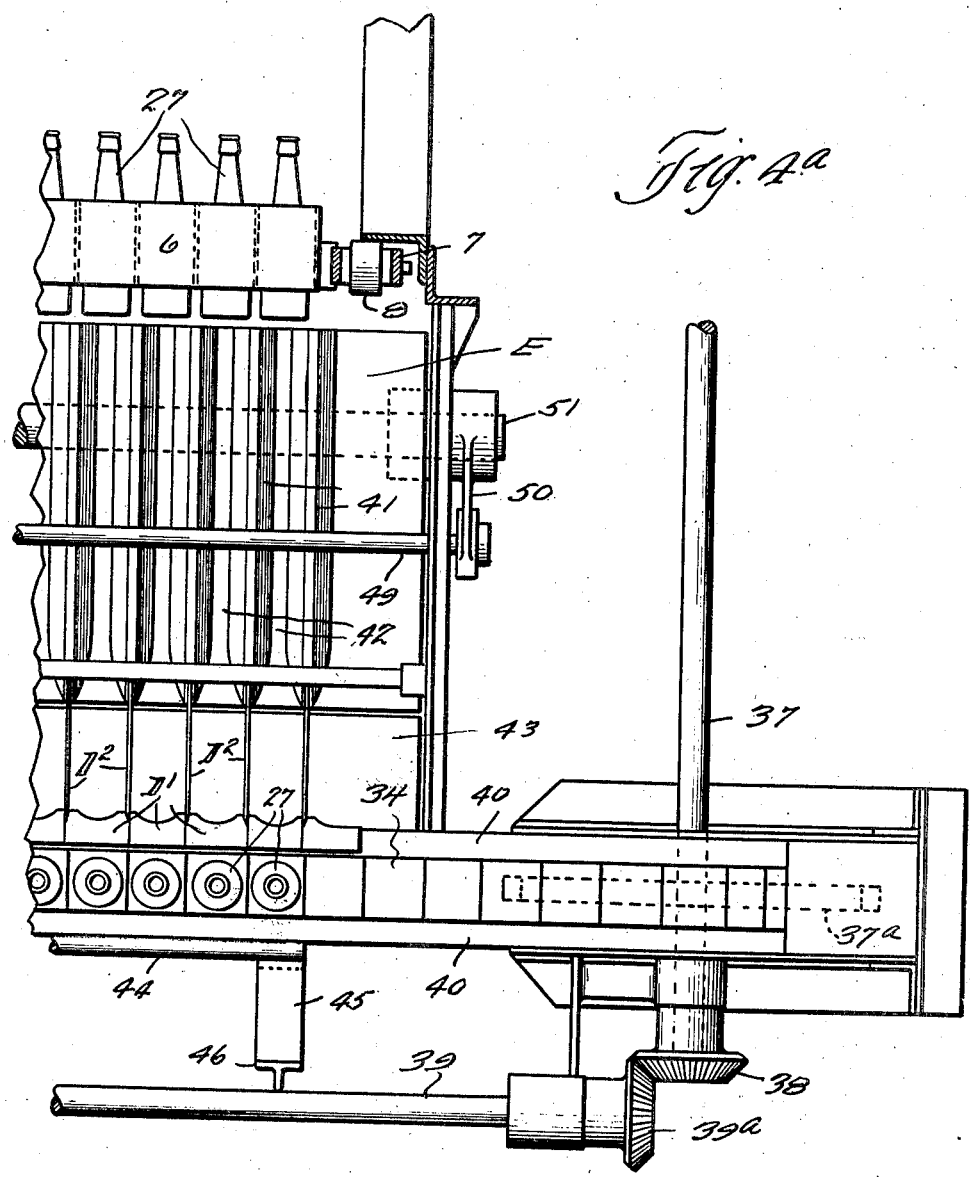

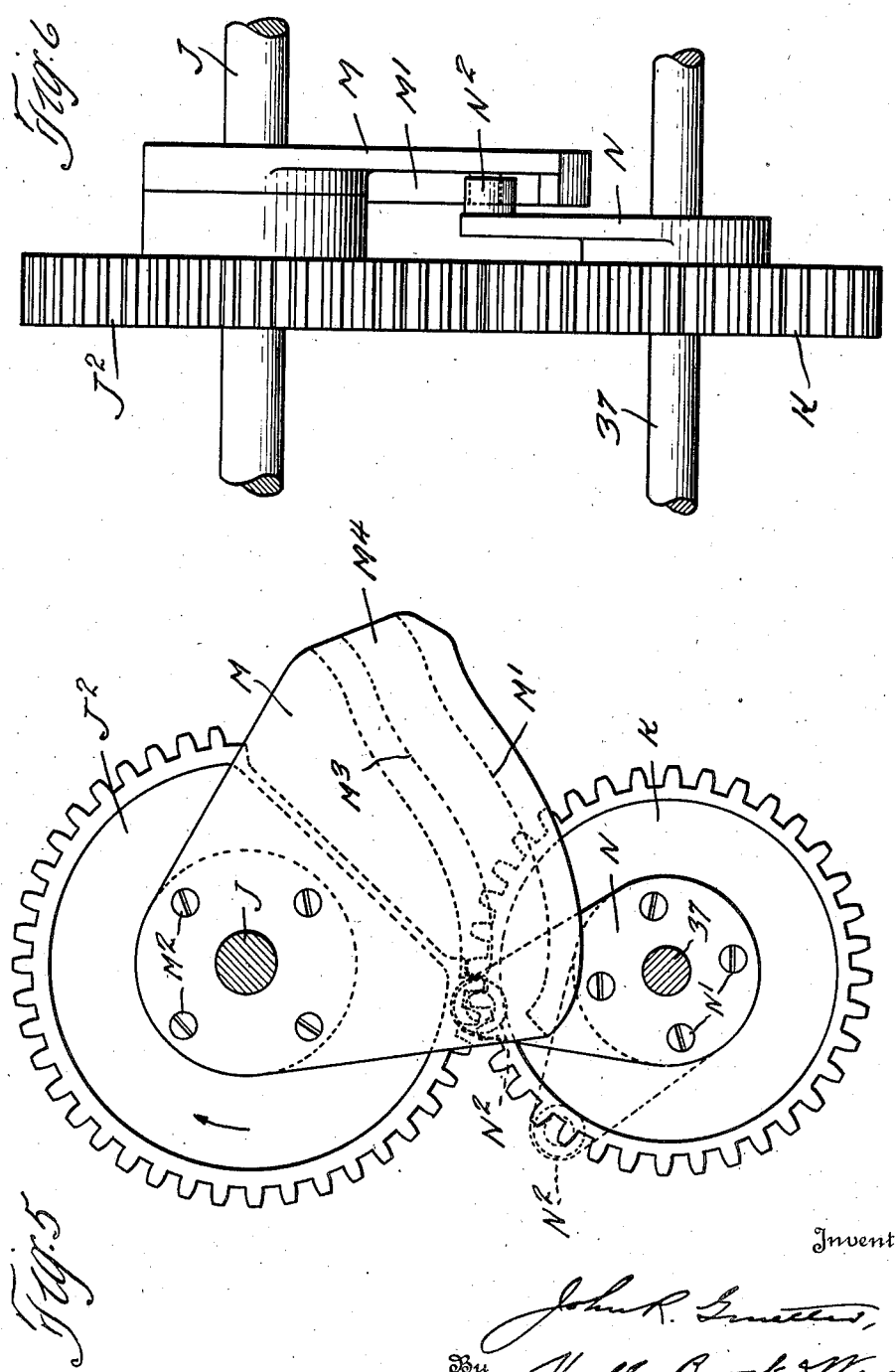

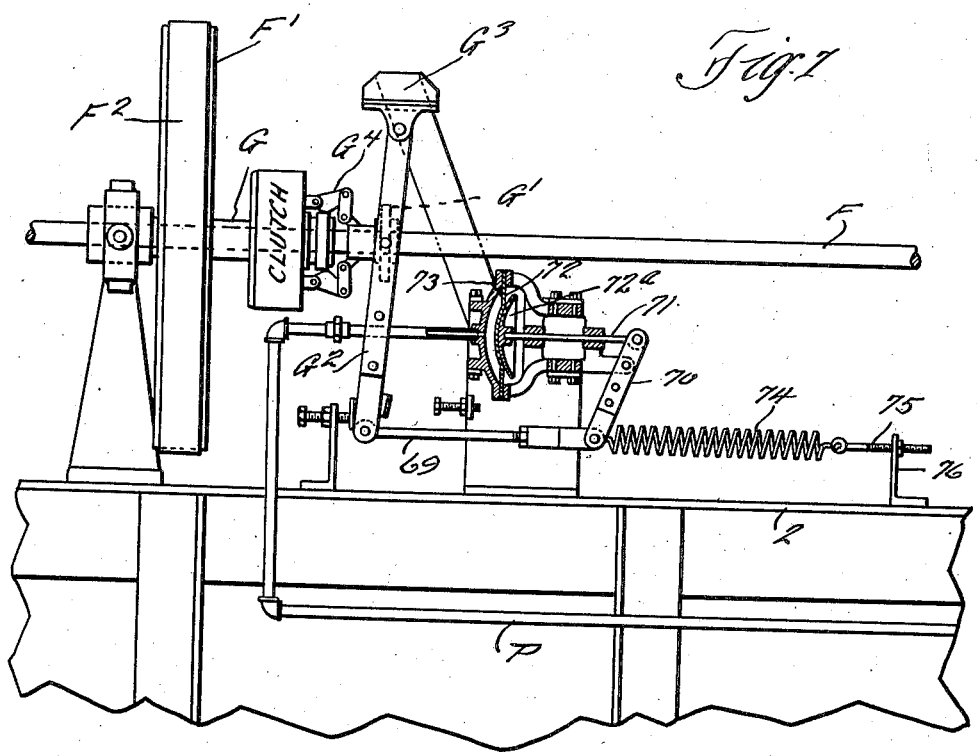

Dec. 19, 1933.  J. R. GRUETTER  1,940,647
BOTTLE HANDLING APPARATUS
Filed Aug. 28, 1930   14 Sheets-Sheet 14
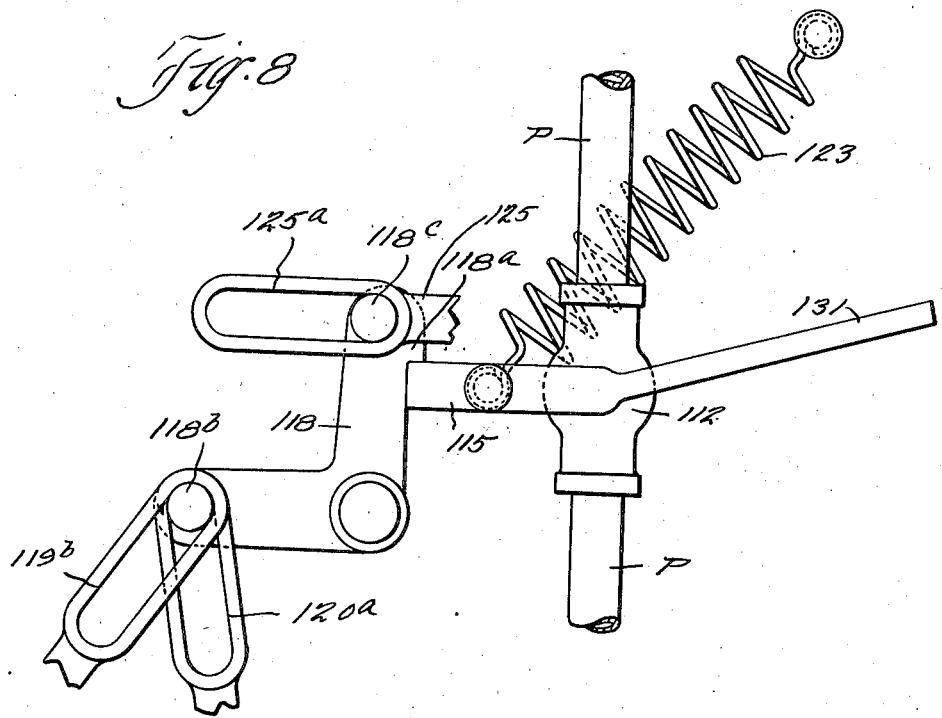
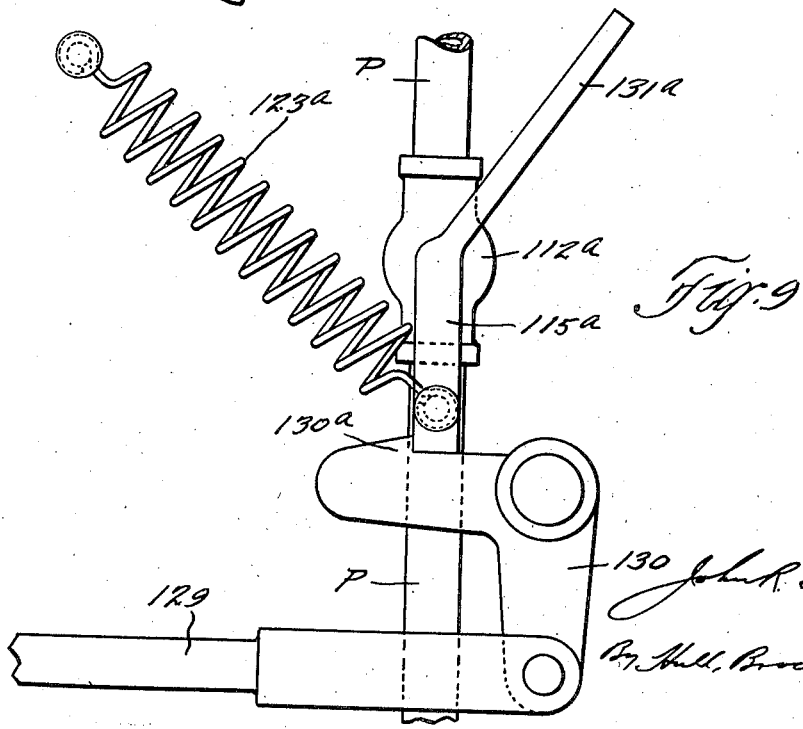

Patented Dec. 19, 1933

1,940,647

UNITED STATES PATENT OFFICE 1,940,647

BOTTLE HANDLING APPARATUS

John R. Gruetter, Cleveland, Ohio

Application August 28, 1930. Serial No. 478,343

20 Claims. (Cl. 198—232)

This invention relates to bottle cleaning apparatus of the type wherein bottles are conveyed in transverse series through a casing or housing wherein they are subjected to successive liquid treatments for the purpose of cleaning and/or pasteurizing the same.

It is the general purpose and object of the invention to provide, for apparatus of this character, improved means for automatically charging the bottles in successive transverse series into the corresponding transverse series of supports by which they are conveyed through the apparatus; to provide for apparatus of such character simple and improved means for driving the bottle carrying conveyor and the charging and discharging mechanism cooperating therewith; also to provide for apparatus of this character improved safety mechanism, whereby the danger to the apparatus through obstruction of the movements of the bottles and of the conveyor therefor may be eliminated.

Further and more limited objects of the invention will appear in the detailed description of the invention as shown in the accompanying drawings wherein Fig. 1 represents a side elevation of an apparatus embodying my invention; Fig. 1$^a$ a side elevation of the lower front or receiving end of the apparatus; Fig. 1$^b$ a similar view of the upper front or receiving end of the apparatus; Fig. 1$^c$ a side elevation of the lower intermediate portion of the apparatus; Fig. 1$^d$ a similar view of the intermediate upper portion of the apparatus; Fig. 1$^e$ a side elevation of the lower rear or delivery end of such apparatus; and Fig. 1$^f$ a similar view of the upper or delivery end of such apparatus; Fig. 2 an enlarged detail in side elevation of the lower front end of the apparatus, showing the charging mechanism with its operating connections; Fig. 3 a detail in section of the charging apparatus; Figs. 4 and 4$^a$ jointly a detail in plan of the front or receiving end of the apparatus, certain parts being shown in section; Fig. 5 a detail in side elevation and Fig. 6 a detail in edge elevation of the gearing employed for operating the charging mechanism; Fig. 7 a detail in sectional elevation of the mechanism for automatically suspending the operation of the main driving shaft; Figs. 8 and 9 are details in elevation of the valves which control the supply of compressed air to the mechanism shown in Figs. 1$^f$ and 7; and Figs. 10 and 11 are details in section of one of said valves.

The particular apparatus shown herein, and with which my invention is embodied, is a pasteurizer comprising in general a casing or housing comprising side walls 1, a cover 2 and a bottom consisting of plates 3, 3$^a$, 3$^b$ and 3$^c$, the said plates constituting bottoms for separate pasteurizing compartments A, A', A$^2$ and A$^3$ extending upwardly from the bottom of the apparatus and merging with the upper portion of the casing. In addition, the casing is provided with a rear wall 4; and each of the chambers A', A$^2$ and A$^3$ is shown as provided with a partition 5 therein extending upwardly from the bottom thereof and approximately midway between the front and rear of such chamber.

The conveyor, which is indicated generally and conventionally at B in Figs. 1—1$^f$ and Fig. 3, consists of transversely extending bottle carriers 6 each secured at its ends to side links 7 flexibly connected in the manner of a chain and having rollers 8 arranged to support the conveyor as a whole on rails (not shown) during the movement of the conveyor through the casing, the links being adapted to engage the teeth of the driving sprockets 9, 9$^a$ located respectively on opposite sides of the front and the rear of the apparatus and at the top thereof.

Each bottle carrier 6 is provided with bottle holders 6$^a$, each shown as having a cylindrical body provided at one end with an annular flange 6$^b$ adapted to engage the side of a bottle and having its other end tapered or frusto-conical, as shown at 6$^c$, to engage the breast of the bottle. The conveyor is of the same general type as shown in the patent to Charles H. Loew and myself granted July 31, 1923 No. 1,463,763. The conveyor, with the bottle carrier and bottles thereon, is driven by the sprockets 9, 9$^a$, thence around a pair of idler rollers 10 in the bottom of the tank A; thence around similar rollers 11 between and above the tanks A and A'; thence around idler rollers 12 at the bottom of one section of the tank A'; thence around like rollers 13 at the top and middle of the tank A'; thence around idler rollers 14 at the bottom of the rear section of the tank A'; and so on around other idler rollers 15, 16, 17, 18, 19, 20, 21 and 22 located at the tops and bottoms of the other tanks and compartments, the conveyor passing from the idler roller 22 upwardly around the rear driving sprocket 9 and thence passing over guide wheels 23 to the delivery mechanism (to be described hereinafter) and thence around a guide 24 and guide wheels 25 at the bottom of the apparatus and beneath the compartments thereof from which last mentioned wheels it passes in a nearly vertical direction around the sprockets 9. The sprockets 11 are mounted in journal blocks 11ª, slidable in vertical guides 11ᵇ and operated by screws 11ᶜ for the purpose of taking up slack in the conveyor B.

In practice, the compartments A, A', A² and A³ contain pasteurizing liquid, heated to varying temperatures so that, when the bottles shall have passed through the compartments A³, they will have been effectually pasteurized. The guides 24 and 25 are mounted in suitable supports provided at the rear and front of the apparatus respectively.

Bottle charging mechanism

The bottle-charging mechanism shown herein comprises generally a conveyor on which the bottles are placed and by means of which they are conducted to a star wheel which, in turn, delivers the bottles one at a time upon another conveyor, extending transversely across the front or receiving end of the machine and from which latter conveyor the bottles are delivered into a dividing and supporting rack, when they are delivered along a grooved table into the appropriate transverse carrier on the conveyor.

26 denotes the first or feeding conveyor on which the bottles 27 are placed (see Figs. 2, 4, 4ª). From this conveyor the bottles are taken one at a time by the grooved peripheral seats 28ª of a star wheel 28, the star wheel being driven in synchronism with the conveyor and in the direction indicated by the arrow by a shaft 29, so that the bottles are taken from the conveyor as they reach the star wheel. The bottles received within the seats in the star wheel are supported on a table 30 beneath such wheel and having a peripheral guide rail 31 extending partly therearound. The bottles are conducted by the star wheel in proximity to a curved lever arm 32 forming a guide rail and thence along a guide rail 33, being delivered from the table 30 on the conveyor 34 extending transversely of the front of the machine. The conveyor 26 is shown as driven by an electric motor 35 through shaft 35ª, pulley 35ᵇ, belt 35ᶜ, pulley 35ᵈ and shaft 35ᵉ, which shaft, through suitable reduction gearing (not shown) drives the shaft 35ᶠ, sprocket 35ᵍ, chain 35ʰ, sprocket 35ⁱ and drive sprocket 36.

The conveyor 34 is driven by a sprocket 37ª and an idler (not shown) at opposite ends thereof, the sprocket 37ª being carried by the shaft 37 (see Fig. 4ª) which shaft, by means of a bevel gear 38 on the front end thereof, drives the shaft 39 through a bevel gear 39ª, the last mentioned shaft driving the star wheel shaft 29 through a bevel pinion 39ᵇ meshing with the pinion 29ª (see Fig. 2).

It will be noted that the star wheel is provided with a blank 28ᵇ in its periphery which is of the width of one of the grooves 28ª, thereby ensuring a gap C of one space between two transverse series of bottles delivered by the star wheel upon the conveyor 34. It will be noted further that the star wheel has as many pockets as there are bottles in a transverse series, but that there is a blank between two of these pockets. The star wheel thus serves as a measuring wheel, delivering successive series of bottles to the conveyor, with spaces between such series. This space, with the timing arrangement to be described hereinafter, permits a series of bottles to be transferred to the conveyor without interference with the operation of the transfer mechanism by the first bottle of the next series on the said conveyor.

When a series of bottles is properly lined up by the conveyor 34 with reference to the seats 6ª in a transverse series of bottle holders, the bottles are first moved from the conveyor into the dividing and supporting rack D, the said rack being supported by its base D' on the rear side of the transverse frame 40 at the front of the machine on which the conveyor 34 travels, the said rack comprising the said base and a plurality of forwardly extending partitions D². The lower ends of these partitions are beveled upwardly and rearwardly, as shown at D³, to register properly with the inclined tops of the upwardly and rearwardly extending V-shaped ribs 41 of the feed table E, there being V-shaped grooves 42 provided between the said ribs along which the bottles are moved (by mechanism to be described) to their seats 6ª.

A transverse series of bottles on the belt 34 having been brought into proper relation to the seat 6ª and the rack D, the said bottles are pushed from the conveyor into the rack and onto an inclined platform 43, located beneath the partitions D² and at the base of the ribs 41, by a pusher bar 44 carried by brackets 45 supported at the upper ends of arms 46 connected to opposite ends of a transverse rock shaft 47 which is mounted in brackets 48 projecting from the front of the apparatus. By rocking this shaft in a manner to be described, the bottles are pushed from the conveyor 34 into the dividing and supporting rack D, where they assume the position shown in dotted lines in Fig. 3, resting on the platform 43 with their necks projecting beyond the said platform and between the grooves of the table E. In this position, the bottoms of the bottles are supported by the forward edge of the base D', with the lower portions of the bottles overhanging a transverse bar 49 having its ends journaled in slots 50ª in the front ends of arms 50 which are mounted on the opposite ends of a transverse rock shaft 51, also supported in the brackets 48. By rocking this shaft, in a manner to be described, the bottles are moved along the table E and are delivered into the seats 6ª provided therefor in the appropriate transverse carrier.

One of the important features of my invention consists in driving the conveyor 34 and the main conveyor B in such manner that, when the bottles are to be charged into the main conveyor, the movement of the conveyors will not be entirely stopped, but will be slowed down to a sufficient extent to enable the bottles to be charged into their respective seats. This manner of operating the conveyors possesses the important advantages that no slack occurs in the chains and gears; that jerky movements of the conveyor 34 are eliminated, which movements might upset the bottles thereon or permit the said conveyor to move a short distance beneath the bottles without advancing the latter and thus cause misalinement between the bottles and the feed table. The means by which these results are secured will be described hereinafter in connection with the complete driving mechanism.

Discharging mechanism

The discharging mechanism at the rear of the machine consists generally of a curved guard 52 which receives the bottoms of the bottles and delivers them upon a delivery rack comprising a transverse platform 53 carried by arms 54 pivoted intermediate their ends on the opposite ends of a shaft 55, each of the arms having at its lower forward end a counterweight 56. The shaft 55 is a rock shaft, which is rocked by an arm 57. Arms 58, secured to the opposite ends of the shaft 55, are connected by adjustable links 59 with a transverse pusher bar 60 supported on the bottom of the platform 53. The shaft 55 is rocked by means of an adjustable link 61 connected at one end to the arm 57 and at its other end to a slot $62^a$ in an arm 62 having a hub $62^b$ by means of which it is secured to a transverse shaft 63. The arm 54 on one side of the apparatus is adjustably suspended from the arm 57 by means of a hook 64 fastened to the arm 54 and overhanging the arm 57 and adjustable with relation to the arm 57 by means of an adjusting screw 65 which extends through the hook and engages the top of the arm 57.

When the shaft 63 is rocked (by mechanism to be described hereinafter) the arm 57 is rocked downwardly, thereby lowering the arms 54 until the platform 53 of the delivery rack engages the seats 66 the tops of which are in approximately the same plane as the rear transverse conveyor 67. After the platform 53 shall have engaged the support 66, further rocking movement of the shaft 55 causes the arms 58 to thrust the links 59 rearwardly, thereby operating the pusher bar 60 to remove the bottles from the platform 53 onto the transverse conveyor 67.

*Driving mechanism*

The driving mechanism consists generally of a main shaft F which is driven from any convenient source of power by a pulley F' and a belt $F^2$, the shaft being driven from the pulley by any standard form of clutch, the one illustrated conventionally herein comprising the sleeve G connected with a pulley and in turn connected with the shaft F by means of a clutch collar G' connected to a lever $G^2$ which is pivoted to a bracket $G^3$, the lower end of the lever being connected to a link 69 which in turn is connected to one end of a lever 70 pivoted intermediate of its ends and having its opposite end connected with a rod 71 which in turn is connected with a disk $72^a$ engaging a diaphragm 72 in a diaphragm chamber 73 (see Fig. 7). A spring 74 is connected at one end to the link 69 and at its opposite end to a bolt or screw 75 threaded into a bracket 76 carried by the cover 2.

The clutch collar $G^1$ is connected in the usual manner by linkage $G^4$ with one of the members of the clutch proper. The purpose of the connections 69—76 will be explained hereinafter. The shaft F is provided at its opposite ends thereof with worms 77 meshing with worm gears 78, each mounted on a stud 79 and each having a pair of diametrically opposed rollers 80 adapted to engage the teeth of a gear 81 of the Geneva-movement type. Each of these gears is connected with a transverse shaft 82, which shafts carry the sprockets 9, $9^a$ for the conveyor. The arrangement of the rollers 80 with reference to the teeth of the gears 81 is such that there is no complete cessation of drive between the worm gears 78 and the gears 81 while one of the rollers 80 leaves and the other enters the space between the teeth of the said gears. However, the arrangement is such that the movement of the gears is almost stopped, the slowness of the movement and the duration of the same being sufficient to enable the bottles to be charged from the conveyor 34 into the appropriate transverse series of bottle holders $6^a$.

The rotation of the shaft F is transmitted to the shafts which operate the charging and discharging apparatus, first through means of a vertical shaft H having at its upper end a bevel gear H' meshing with a bevel pinion $H^2$ on a shaft $H^3$, the last mentioned shaft having a spur gear $H^4$ at one end thereof meshing with a pinion $F^3$ on the shaft F. The gearing $F^3$, $H^4$, $H^2$ and H' constitutes a reduction gearing for driving the shaft H at a slower speed than the shaft F.

The shaft H is supported in brackets 83, 84 mounted near the top and bottom of the apparatus, respectively, and the lower end of the shaft is provided with a bevel pinion $H^5$ meshing with a bevel gear J' on a longitudinally extending shaft J, which is supported in brackets on the side of the apparatus. Adjacent to its front end, the shaft J is provided with a segmental gear $J^2$ which segmental gear meshes with a gear K on the shaft 37 which extends forwardly to and through the supporting frame L for the conveyor 34 and the star wheel and its platform, and is provided at its forward end with the bevel pinion 38 which drives the shaft 39. The driving connection between the shafts J and 37, which includes the gears $J^2$ and K and by means of which the slowing down of the conveyor 34 and of the star wheel is effected, will now be described—see in particular Figs. $1^a$, 5 and 6.

The segmental gear $J^2$ has secured thereto a cam M, the cam bridging the gap between the ends of the toothed portion of the gear and being provided with a track M' in the face thereof which is presented toward the gears $J^2$ and K. The cam is shown as secured to the gear hub by means of screws $M^2$.

Secured to the hub of the gear K by screws N' is an arm N which carries a roller $N^2$. The axis of this roller is substantially coincident with the pitch line of the gear K. The arm and the cam are secured to their respective gears in such manner that, assuming the gear $J^2$ to be driven in the direction indicated by the arrow, just as the teeth at one end of the segmental gear $J^2$ are disengaging the teeth of the gear K, the roller $N^2$ enters the cam track M' and drives the gear $J^2$ by engagement with the wall $M^3$. While this cam track is co-extensive in angular extent with the gap between the ends of the gear teeth on the segmental gear $J^2$, it will be noted that its distance from the center of the shaft J increases from its receiving end toward its delivery end, having a short final portion $M^4$ which is given a special contour, for a purpose to be specified hereinafter. A driving engagement is provided between the roller $N^2$ and the inner wall $M^3$ of the cam track during the period when the teeth on the segmental gear are out of mesh with the teeth on the gear K. Due to the shape of the cam track, the speed at which the shaft 37 is driven is materially reduced during the major portion of the time when the gears $J^2$ and K are out of mesh, as will be evident from the position of the arm N and roller $N^2$ shown in dotted lines, this position showing the extent of angular movement of the gear K while the gear $J^2$ has turned through an angle corresponding to the gap between the teeth thereon. Furthermore, the movement of the gear K throughout the major portion of this angular movement has been very slow, due to the contour of the cam track M', the final movement being accelerated, due to the contour of the part $M^4$ thereof, thereby to enable the teeth to mesh without imparting a jerky movement to the shaft 37 and to the parts driven therefrom. This manner of slowing down the shaft 37 during each rotation thereof, effects a like slowing down of the shafts 39 and 29 during each rotation thereof, with the result that there is a nearly, though not complete, cessation of the delivery movement of the star wheel and a nearly, but not complete, cessation of the traveling movement of the conveyor 34. The parts are so proportioned and timed that this slowing down in the movement of the conveyor 34 and in the delivery movement of the star wheel 28 occurs when the movement of the conveyor B is nearly but not completely stopped by the driving mechanism described hereinbefore and also during the period required for the reciprocation of the bars 44 and 49. The connections by which the said bars are driven from the shaft J will now be described:—

At its front end the shaft J is provided with a bevel gear J³ meshing with a bevel gear T' on the end of a transverse shaft T. At its opposite end, the shaft T is provided with a cam T² having cam tracks T³ and T⁴ on opposite sides thereof. The cam track T³ serves, through connections to be described, to operate the rod 49 which moves the bottles along the table E to their seats in one of the transverse sections of the conveyor, while the cam track T⁴ on the opposite side of the cam serves to operate, through suitable connections, the pusher bar 44. The detailed construction through which these bars are operated by the cam will now be described.

85 denotes a lever arm which is pivoted at one end to one side of the apparatus, as by a stud 86. (See Fig. 2.) Intermediate its ends, the lever is provided with a roller 87 which rides in the cam track T³. At its free or swinging end, it has pivoted thereto a link 88 which is adjustable in length and which has its opposite end slidably and pivotally connected to the end of an arm 89 which is loose upon the transverse rock shaft 51. This slidable and pivotal connection is effected by means of a pin 88ª on the link 88 engaging a slot 89ª on the end of the arm. The shaft 51 carries the arms 50 which in turn carry the rod 49 which moves the bottles along the table E. The arm 89, while loose upon the shaft 51, is normally yieldably connected thereto by the following means:— 90 denotes a triangular bracket frame which is keyed on the shaft 51. To the upper end of this frame there is pivoted at 90ª the upper end of a lever 91, the said lever carrying a roller 92 intermediate its ends adapted to enter a notch 89ᵇ in a hub-like projection of the arm 89. To the lower end of the lever 91 a rod 93 is pivotally connected, the said rod extending through a lug 90ᵇ on the frame 90, there being a spring 94 surrounding the rod and bearing at one end against the lug 90ᵇ and at its opposite end against an adjustable abutment 93ª carried by the rod. This spring, together with the lever 91 and roller 92 provides, under normal conditions, a driving connection between the shaft 51 and the arm 89 whereby the shaft may be rocked through said arm and the mechanism connected therewith. Secured to the lower arm of the lever 91 is an arm 95 the lower end of which extends across the center of the end of the shaft 51.

The arms 46 which carry the pusher rod or bar 44 are operated in practically the same manner as the arms 50, but from the cam track T⁴ on the opposite side of the cam T² from the track T⁴. 96 denotes a lever arm, similar to the lever arm 85 and arranged on the opposite side of the disk T² from the latter arm and conveniently pivoted on the stud 86. The arm 96 also carries a roller cooperating with the track T⁴, the swinging end of the arm being connected by a link 97, similar to the link 88 and connected in a similar manner (through pin 97ª and slot 98ª) to an arm 98, corresponding to the arm 89. The arm 98 is mounted on the rock shaft 47 (to which the arms 46 are secured) in the same manner as the arm 89 is mounted on the rock shaft 51. The arm 98 is provided with the notch 98ᵇ for the roller 99ª carried by the lever 99 which is pivoted at one end to the bracket frame 100, the opposite end of the lever 99 being provided with the rod 101 which extends through the guide lug 100ª on the bracket frame, the rod being surrounded by a spring 102 corresponding to the spring 94 and operating in the same manner to effect a yieldable driving connection between the arm 98 and the shaft 47. 103 denotes an arm, corresponding to the arm 95, which is carried by the lever 99 and which extends across the center of the shaft 47.

Under normal conditions, the rotation of the drive shaft F will be transmitted through the connections described to the shaft T and thence through the shafts 47 and 51 to the mechanism which transfers the bottles from the conveyor 34 to the dividing and supporting rack and from the said rack along the table E and into the conveyor seats.

At the rear or delivery end of the machine, as has been pointed out hereinbefore, the shaft 63 is rocked by the arm 62. The connections whereby the said arm is operated will now be described. The rear end of the shaft J is provided with a bevel pinion J⁴ which meshes with a bevel pinion O' on a shaft O which carries a cam P' having a cam track P². This track receives a roller 104ª on one arm of a bell crank lever 104 which is pivotally supported at 105, the end of the other arm of said lever being connected by a link 106, adjustable in length, to a bracket 107, similar to the brackets 90 and 100 but which, in this case, is loose upon the shaft 63, being yieldably connected thereto by means of the lever 108 which is pivotally connected at its upper end to said frame, as indicated at 108ª, and which is provided with a roller 108ᵇ intermediate its ends engaging a notch in the hub portion of the arm 62, as is the case with the levers 91 and 99. The roller is normally maintained in driving engagement with the notch by the spring 109 surrounding the rod 110, which is connected to the lower end of the lever and operated in the same manner as the rods 93 and 101. The lever 108 has also connected thereto an arm 111, the lower end of which extends across the axis of the shaft 63.

Safety mechanism

The purpose of the yieldable driving connections for the shafts 47, 51 and 63 is not only to prevent the movement of the arms 46, 50 and 54 and the parts connected therewith in the event that the movement of these parts is blocked, as by the misalinement of a bottle or the failure of a bottle to be delivered from its carrier upon the platform 53, but also to effect the complete shutting down of the apparatus, including the driving of the conveyor, when such blocking or stoppage of the charging mechanism and of the main conveyor occurs. For this purpose, each of the three bottle charging mechanisms and the bottle discharging mechanism has connections whereby, in the event of such blocking or stoppage, an air line P leading to the diaphragm chamber 73 (see Fig. 7) will be vented. This venting will enable the spring 74 to break the driving connection, through the clutch mechanism, between the pulley F' and the shaft F; this driving connection cannot be reestablished except by resetting the particular valve which has vented the air line. The details whereby this automatic venting may be accomplished will be described in connection with each of the four mechanisms referred to—see particularly Figs. 2, 4, 8, 9, 10 and 11.

112 denotes the casing of an air valve which is common to the pusher bars 44 and 49 and their operating mechanisms. Within the casing 112 is a three-way valve 113 having a through port 114 which normally registers with the parts of the air line P connected thereto and which is provided with an operating arm 115. The valve casing is also provided with a port 116, at right angles to the port 114, which is adapted, when the arm 115 is moved approximately 90° (as indicated in Fig. 11) to vent the part of the air line leading to the diaphragm chamber through such port and through an exhaust port 117 provided in the valve casing. In operation, the arm 115 is normally held in position to permit the flow of air to the diaphragm chamber 73 by means of a hook 118$^a$ on the end of one arm of a bell crank lever 118, one end of the opposite arm of which is connected by a link 119 with the end of the arm 95, coincident with the axis of the shaft 51, as shown at 119$^a$. The link 119 is connected with the bell crank lever by means of a stud 118$^b$ on said lever entering a slot 119$^b$ at the upper end of the link.

The stud 118$^b$ is also connected with the arm 103, the connection being effected by means of a link 120 having an elongated slot 120$^a$ at one end thereof receiving the stud 118$^b$, the opposite end of the link being connected with one arm of a bell crank lever 121, the opposite arm of which is connected by a link 122 with the end of the arm 103 at a point 122$^a$ coincident with the axis of the shaft 47.

A spring 123 which is fastened to the arm 115 tends to turn the valve to the position shown in Fig. 11 when the said arm is released by the disengagement of the hook 118$^a$.

With the parts constructed and arranged as described, it will be evident that, should either of the rods 44, 49 encounter an obstruction, during their delivery movements, which obstruction may be caused by the disalinement of one or more bottles, this obstruction will release the roller 92 or roller 99$^a$ from the notch in the corresponding arm 89 or 98, with the result that the arm from which the roller is thus disengaged will be moved about its shaft, throwing the roller outwardly upon its hub-like portion and thereby rocking the arm 95 or 103 to an extent to disengage the hook 118$^a$ from the arm 115, whereupon the spring 123 will turn the valve 113 to the position shown in Fig. 11, thus venting the line from the diaphragm chamber backwardly to and through the valve which has thus been opened, which will cause a cessation of the conveyor drive. This cessation of the conveyor drive may also be caused by venting the same valve 113 in the event that there is any blocking of the delivery movement of the star wheel 28, with a corresponding cessation in the driving of said wheel.

By reference to Figs. 2 and 4, it will be seen that the guide-rail member 32 is formed as a lever which is pivoted on a vertical post 32$^a$. The guide rail member 32 itself carries a bell crank lever, one arm 124 of which is connected by a link 125 with the upper arm of the bell crank 118, by means of a pin 118$^c$ on said arm and a slotted extension 125$^a$ of said link. The other arm 126 of said bell crank has a spring 127 connected to it which normally holds the guide-rail member 32 in proper relation to the star wheel. When the said guide-rail member is rocked outwardly by an obstruction to the feeding operation of the star wheel, this movement disengages the hook 118$^a$ from the valve operating arm 115, and the spring 123 opens the valve in the manner described hereinbefore.

On Figs. 1$^e$ and 9 I have indicated the manner in which the air line will be vented in the event of a stoppage of or obstruction in the delivery of the bottles, and particularly in the delivery of bottles from the support 53 to the conveyor 67.

As the bottles leave the upper portion of the apparatus they are conducted, with their bottoms directed rearwardly, to the downwardly and forwardly curved guard 52, the lower end of which guard registers with the bottom of the delivery rack platform 53. The bottles are delivered on such platform bottom downward, and the support is rocked in the manner described hereinbefore, until its bottom is received by one or more supports 66. When the bottom support 53 has been thus received, further movement of the arms 58 causes the links 59 to operate the pusher bar 60, thereby to deliver the bottles to the conveyor 67. Should there be any failure to deliver a bottle from one of the transverse carriers onto the platform 53, the bottle, being carried by the conveyor B, will engage the pusher bar 60 before the arms 54 are rocked downwardly and will move the pusher bar forwardly, thereby rocking the arms 58 and 57, causing the link 61 to rock the arm 62, whereupon the roller 108$^b$ will ride out of the notch in the hub portion of the arm 62, rocking the arm 111 against the action of the spring 109. The arm 111 carries at its end, normally in alinement with the axis of the shaft 63, a stud 111$^a$, which engages the upper end of a lever 128. When the roller 108$^b$ leaves the notch provided therefor in the hub of the arm 62, the stud rocks the lever 128, thereby moving a link 129 connected with the lower end of said lever, which link, through connections similar to those described hereinbefore, rocks a bell crank lever 130 having a hook 130$^a$ which normally engages the handle 115$^a$ of the valve within the casing 112$^a$ to hold such valve with its through port in register with the air line. When the lever 128 is rocked in the manner described, the hook on the bell crank lever disengages the valve handle, and the spring 123$^a$ moves the valve to the position shown in Fig. 11, in the same manner as the spring 123 operates the valve 113.

*General operation*

In operation the bottles are placed upon the conveyor 26 and are conducted by the same to the pockets 28$^a$ of the rotating star wheel 28, whence they are delivered successively upon the transverse conveyor 34. The bottles are divided into transverse series by the blank space 28$^b$ on the star wheel. A transverse series of bottles having been conducted in proper operative relation to the supporting and dividing rack, they are then moved into said rack by the pusher bar 44, being properly alined by said rack with reference to the grooves in the table E. They are then moved by the pusher bar 49 along the table E and delivered into a transverse series of bottle seats 6. During the reciprocation of the bars 44 and 49, the driving connections between the shaft F and the sprockets which drive the conveyor will have nearly suspended the movement of the latter, but without entirely stopping the movement of the sprockets, gears and conveyor. Furthermore, the movement of the star wheel and of the transverse conveyor 34 will have been slowed down correspondingly during this period, but without entire cessation of movement. The bottles are conducted through the various departments of the pasteurizer and, having been completely pasteurized, are delivered in successive series upon the supporting platform 53 whence they are in turn delivered to the transverse conveyor 67.

Should any obstruction be encountered by any of the three mechanisms for charging the bottles into the apparatus and/or the mechanism for delivering the bottles from the apparatus, such obstruction will open one of the air valves 112 or 112a to the atmosphere, thus releasing the pressure in the diaphragm chamber and breaking the driving connection between the drive pulley and the main drive shaft. The machine cannot be started until the operator goes to the particular valve which has been so operated to vent the diaphragm chamber and resets the same by hand, each valve being provided with a resetting handle 131, 131a for this purpose. In addition to the automatic valves 112, 112a, the air line is provided with a hand operated valve 132 at the front of the apparatus, the said valve being provided with a handle 132a; also with a hand operated valve 133 at the rear of the apparatus, the valve being provided with an operating handle 133a. The air is supplied through the air line from front to rear, first through the valve 132, then through the valve 112, then through the valve 133, then through the valve 112a, and then to the diaphragm chamber 73.

From the foregoing description, it will be apparent that I have provided a particularly effective means for delivering bottles in successive transverse series into the transverse bottle carriers provided therefor and for automatically removing successive transverse series of bottles from their respective carriers at the delivery end of a bottle cleaning and/or pasteurizing apparatus; also that I have provided an apparatus of this character with improved and efficient means for charging bottles into and delivering the same from such apparatus; that I have provided apparatus of this character with improved and simplified driving mechanism; and that I have also provided apparatus of this character with efficient means for ensuring the safe operation of the charging, delivering, and conveying apparatus.

Having thus described my invention, what I claim is:

1. In an apparatus of the character described, the combination of a conveyor having thereon transversely extending bottle carriers each provided with bottle seats, a transverse conveyor at the front of the said apparatus, mechanism for delivering to the second conveyor successive series of bottles corresponding in number to the seats in each transverse carrier, a grooved delivering table interposed between the second conveyor and the front of the first conveyor and adapted to register at its delivery end with successive transverse bottle carriers on the first conveyor, a dividing rack interposed between the second conveyor and the said table, a pusher bar for delivering each series of bottles on the second conveyor into the said rack, a feeding bar for delivering the bottles from the dividing rack along the said table and into a transverse carrier on the first conveyor, a bottle receiving and delivering rack at the rear of said apparatus and adapted to receive successive series of bottles from the carriers on the first mentioned conveyor, means for driving the first and second conveyors, the delivering mechanism, the pushing and feeding bars and the delivery rack, and means for automatically suspending the driving of both conveyors, of the mechanism for delivering bottles to the second conveyor, of either of the said bars, and of the receiving and delivery rack, through obstruction of the movement of said delivering mechanism, or of either of the said bars, or of the first mentioned conveyor, or of the delivery rack.

2. In an apparatus of the character described, the combination of a conveyor having thereon transversely extending bottle carriers each provided with bottle seats, a transverse conveyor at the front of the said apparatus, mechanism delivering to such second conveyor successive series of bottles corresponding in number to the seats in each transverse carrier, a grooved delivering table interposed between the second conveyor and the front of the first conveyor and adapted to register at its delivery end with successive transverse bottle carriers on the first conveyor, a dividing rack interposed between the second conveyor and the said table, a pusher bar for delivering each series of bottles on the second conveyor into the said rack, a feeding bar for delivering the bottles from the dividing rack along the said table and into a transverse carrier on the first conveyor, a bottle receiving and delivering rack at the rear of said apparatus and adapted to receive successive series of bottles from the carriers on the first mentioned conveyor, means including a shaft and clutch mechanism thereon for driving the first conveyor, means for driving from said shaft the second conveyor, the pusher and feeding bars, the delivery mechanism, and the receiving and delivery rack, and means for automatically disengaging the clutch when the movement of the first conveyor, or of the delivering mechanism, or of either of the said bars, or of the delivery rack is obstructed.

3. In an apparatus of the character described, the combination of a conveyor having thereon transversely extending bottle carriers each provided with bottle seats, a conveyor for bottles extending transversely of the front of the said apparatus, a grooved delivery table interposed between the second conveyor and the first conveyor, a dividing rack interposed between the second conveyor and the table and adapted to aline bottles received therein with respect to the grooves in the said table, a pusher bar for moving bottles from the second conveyor into said rack, a feeding bar for transferring the bottles thus moved along the feed table and into the bottle seats on the transverse carrier, means for driving the said conveyors and the pusher and feeding bars, and means for automatically suspending the movement of both conveyors and of the pusher and feeding bars by obstruction of the movement of the first mentioned conveyor or of either of said bars.

4. In an apparatus of the character described, the combination of a conveyor having thereon transversely extending bottle carriers each provided with bottle seats, a transverse conveyor at the front of the said apparatus, a dividing and supporting rack interposed between the second conveyor and the first conveyor, a pusher bar for delivering each series of bottles on the second conveyor into the said rack, means including a feeding bar for transferring the bottles from the dividing and supporting rack into a transverse carrier on the first conveyor, a bottle receiving and delivering rack at the rear of said apparatus and adapted to receive successive series of bottles from the carriers on the first mentioned conveyor, means for driving the first and second conveyors, the pushing and feeding bars, and the delivery rack, and means for automatically suspending the driving of both conveyors, of either of the said bars, or of the delivery rack through the obstruction of the movement of either of the said bars, of the first mentioned conveyor, or of the delivery rack.

5. In an apparatus of the character described, the combination of a conveyor having thereon transversely extending bottle carriers each provided with bottle seats, a transverse conveyor at the front of the said apparatus, means for delivering to such second conveyor successive series of bottles corresponding in number to the seats in each transverse carrier, a dividing and supporting rack interposed between the second conveyor and the first conveyor, a pusher bar for delivering each series of bottles on the second conveyor into the said rack, means including a feeding bar for transferring the bottles from the dividing and supporting rack into a transverse carrier on the first conveyor, a bottle receiving and delivering rack at the rear of said apparatus and adapted to receive successive series of bottles from the carriers on the first mentioned conveyor, means including a shaft and clutch mechanism thereon for driving the first conveyor, means for driving the second conveyor, the pusher and feeding bars and the delivery rack from the said shaft, and means for automatically disengaging the clutch when the movement of the first conveyor, of either of the said bars, or of the delivery rack is obstructed.

6. In an apparatus of the character described, the combination of a conveyor having thereon transversely extending bottle carriers each provided with bottle seats, a conveyor for bottles extending transversely of the front of the said apparatus, a dividing rack interposed between the second conveyor and the first conveyor, means for transferring bottles from the second conveyor through the said rack and into the seats in a carrier on the first conveyor, means for driving the said conveyors and a movable element of the transferring means, and means for automatically suspending the movement of both conveyors and of said movable element by obstruction of the movement of the first mentioned conveyor or of said transferring means.

7. In an apparatus of the character described, the combination of a conveyor having thereon transversely extending bottle carriers each provided with bottle seats, bottle supporting means extending transversely of the front of said apparatus, a dividing rack interposed between the said support and the said conveyor and adapted to align bottles received therein with respect to the seats in a carrier, a pusher bar for moving bottles into the support from the said rack, means including a feeding bar for transferring bottles from the said rack into the said seats in a carrier on said conveyor, and means for automatically suspending the operation of the conveyor and of the pushing and feeding bars through the obstruction of the movement of the said conveyor or of either of the said bars.

8. In an apparatus of the character described, the combination of a conveyor having thereon transversely extending bottle carriers each provided with bottle seats, bottle supporting means transversely of the front of said apparatus, bottle-aligning mechanism including a supporting surface over which bottles may be moved interposed between the said support and the said conveyor, means for moving bottles from the said support through the said aligning mechanism and over said surface into the seats in a carrier on said conveyor, and means for automatically suspending the operation of the conveyor and of the bottle transferring means through the obstruction of the movement of the said conveyor or of the said transferring means.

9. In an apparatus of the character described, the combination of a conveyor having thereon transversely extending bottle carriers each provided with bottle seats, means for delivering bottles in transverse series successively into the seats of said carriers, a delivery rack at the rear of said apparatus adapted to receive and deliver successive series of bottles from the said carriers, means for driving the said conveyor and the said rack, and means including an air valve whereby the movement of the said conveyor and the operation of said rack will be automatically suspended by the engagement with said rack of a bottle retained in a carrier.

10. In an apparatus of the character described, the combination of a conveyor having thereon transversely extending bottle carriers each provided with bottle seats, means for delivering bottles in transverse series successively into the seats of said carriers, a delivery rack at the rear of said apparatus adapted to receive and deliver successive series of bottles from the said carriers, means for driving the said conveyor and the said rack, and means including an air valve whereby the movement of the said conveyor will be automatically suspended by the engagement with said rack of a bottle retained in a carrier with said rack.

11. In an apparatus of the character described, the combination of a conveyor having thereon transversely extending bottle carriers each provided with bottle seats, means for delivering bottles in transverse series successively into the seats of said carriers, a delivery rack at the rear of said apparatus adapted to receive successive series of bottles from the bottle carriers, the said rack comprising a pusher bar for removing the bottles therefrom, means for driving the said conveyor, connections between the said driving means and the bottle delivery rack for operating the pusher bar, and means operative by the engagement of a bottle retained in a carrier with said pusher bar for automatically suspending the operation of the conveyor.

12. In an apparatus of the character described, the combination of a conveyor having thereon transversely extending bottle carriers each provided with bottle seats, a support for a transverse series of bottles in front of said apparatus, mechanism for delivering to said support successive series of bottles, means for charging the bottles from said support into successive carriers on said conveyor, means for driving said conveyor, and means operative by the obstruction of the movement of the said mechanism for automatically suspending the operation of said conveyor and mechanism.

13. In an apparatus of the character described, the combination of a conveyor having thereon transversely extending bottle carriers each provided with bottle seats, a support for a transverse series of bottles in front of said apparatus, mechanism for delivering to said support successive series of bottles, means for charging the bottles from said support into successive carriers on said conveyor, means for driving said conveyor, connections between such driving means and such delivering mechanism, and means operative through the obstruction of the movement of the bottle delivering mechanism for automatically suspending the conveyor driving means.

14. In an apparatus of the character described, the combination of a conveyor having thereon transversely extending bottle carriers each provided with bottle seats, a support extending transversely of the front of said apparatus for successive transverse series of bottles, mechanism for delivering series of bottles successively upon said support, means for delivering the bottles in successive series from said support into the bottle carriers, a bottle receiving and delivering rack at the rear of said apparatus adapted to receive successive series of bottles from the conveyor and to deliver the same to the support, a shaft for driving the said conveyor, means including a clutch for driving the said shaft, means tending to disconnect said clutch, means including an air-pressure conduit for normally holding the clutch in driving engagement with said shaft, the said air-pressure conduit extending in proximity to the delivering and charging mechanism at the front of the apparatus and in proximity to the receiving and delivering rack at the rear of the apparatus, a valve in said conduit adjacent to the front of said apparatus and a valve in said conduit adjacent to the rear of the said apparatus, driving connections between the said shaft and the delivering mechanisms at the front of the apparatus and between the said shaft and the receiving and delivering rack at the rear of the apparatus, connections operative by the blocking of the movement of either of the delivering mechanisms at the front of the apparatus for automatically opening the valve there located thereby to vent the air conduit and permit the clutch to be disengaged, means operative by the engagement of a bottle retained in the conveyor with the receiving and delivering rack at the rear of the apparatus for automatically venting the air valve there located, and means associated with each valve for resetting the same.

15. In apparatus of the character described, the combination of a conveyor having thereon transversely extending bottle carriers each provided with bottle seats, a support extending transversely of the front of said apparatus for successive transverse series of bottles, mechanism for delivering series of bottles successively upon said support, a delivery table interposed between the said support and the front of said conveyor, a pusher bar for transferring bottles from the support to the table, a feeding bar for moving the bottles thus transferred along the table and delivering the same in successive series into the bottle carriers, a bottle receiving and delivering rack at the rear of said apparatus adapted to receive successive series of bottles from the conveyor and deliver the same to the support, a shaft for driving the said conveyor, means including a clutch for driving the said shaft, means tending to disconnect said clutch, means including an air pressure conduit for normally holding the clutch in driving engagement with said shaft, the said air pressure conduit extending in proximity to the delivering and charging mechanism at the front of the apparatus and in proximity to the receiving and delivering rack at the rear of the apparatus, a valve in said conduit adjacent to the front of said apparatus and a valve in said conduit adjacent to the rear of the said apparatus, driving connections between the said shaft and the delivering mechanism and the pusher and feeding bars at the front of the apparatus and between the said shaft and the receiving and delivering rack at the rear of the apparatus, connections operative by the blocking of the movement of either the delivering mechanism, the pusher bar or the feeding bar at the front of the apparatus for automatically opening the valve there located thereby to vent the air conduit and permit the clutch to be disengaged, means operative by the engagement of a bottle retained in the conveyor with the receiving and delivering rack at the rear of the apparatus for automatically venting the air valve there located, and means associated with each valve for resetting the same.

16. In an apparatus of the character described, the combination of a conveyor having thereon transversely extending bottle carriers each provided with bottle seats, a support extending transversely of the front of said apparatus for successive transverse series of bottles, a delivery table interposed between the said support and the front of said conveyor, a pusher bar for transferring bottles from the support to the table, a feeding bar for moving the bottles thus transferred along the table and delivering the same in successive series into the bottle carriers, a bottle receiving and delivering rack at the rear of said apparatus adapted to receive successive series of bottles from the conveyor and deliver the same to a support, a shaft for driving the said conveyor, means including a clutch for driving the said shaft, means tending to disconnect said clutch, means including an air-pressure conduit for normally holding the clutch in driving engagement with said shaft, the said air-pressure conduit extending in proximity to the charging mechanism at the front of the apparatus and in proximity to the receiving and delivering rack at the rear of the apparatus, a valve in said conduit adjacent to the front and a valve in said conduit adjacent to the rear of the said apparatus, driving connections between the said shaft and the pusher and feeding bars at the front of the apparatus and between the said shaft and the receiving and delivering rack at the rear of the apparatus, connections operative by the blocking of the movement of the pusher bar or the feeding bar at the front of the apparatus for automatically opening the valve there located thereby to vent the air conduit and permit the clutch to be disengaged, means operative by the engagement of a bottle retained in the conveyor with the receiving and delivering rack at the rear of the apparatus for automatically venting the air valve there located, and means associated with each valve for resetting the same.

17. In an apparatus of the character described, the combination of a conveyor having thereon transversely extending bottle carriers each provided with bottle seats, mechanism at the front of said apparatus for charging bottles in successive series into the transverse carriers, mechanism at the rear of said apparatus for receiving and delivering transverse series of bottles in succession from the carriers on the conveyor and for delivering them upon a support, a shaft for driving the said conveyor, means including a clutch for driving such shaft, connections between the said shaft and the charging and discharging means for operating the same from said shaft, means tending to disengage said clutch from said shaft, means including an air-pressure conduit for normally holding the clutch in driving engagement with said shaft, the said air pressure conduit extending in proximity to the charging and discharging means, valves for venting the said air pressure conduit and arranged respectively in proximity to the said charging and discharging mechanisms, and connections for automatically opening the said valves to vent said conduit through the obstruction of the movement of the charging mechanism and through the obstruction of the movement of the conveyor and of the discharging mechanism.

18. In an apparatus of the character described, the combination of a conveyor having thereon transversely extending bottle carriers each provided with bottle seats, mechanism at the front of the said apparatus for charging bottles in successive series into the transverse carriers, mechanism at the rear of the said apparatus for receiving and delivering transverse series of bottles in succession from the carriers on the conveyor, a shaft for driving the said conveyor, means including a clutch for driving such shaft, connections between the said shaft and the charging and discharging mechanisms for operating the same from said shaft, means tending to disengage said clutch from said shaft, means including an air pressure conduit for normally holding the clutch in driving engagement with said shaft, the said air pressure conduit extending in proximity to the charging and discharging mechanisms at the front and rear of the apparatus, respectively, valves in the said conduit adjacent to the charging and discharging mechanisms, respectively, connections between the charging and discharging mechanisms for automatically opening the valves adjacent thereto and venting the said conduit through obstruction of the movement of either of the said mechanisms, and additional manually operated valves in said line adjacent to the front and rear thereof.

19. In an apparatus of the character described, the combination of a conveyor having thereon transversely extending bottle carriers each provided with bottle seats, mechanism at the front of said apparatus for charging bottles in successive series into the transverse carriers, mechanism at the rear of said apparatus for receiving and delivering transverse series of bottles in succession from the carriers on the conveyor and for delivering them upon a support, a shaft for driving the said conveyor, means including a clutch for driving such shaft, connections between the said shaft and the charging and discharging means for operating the same from the said shaft, means tending to disengage said clutch from said shaft, means including an air pressure conduit for normally holding the clutch in driving engagement with said shaft, the said air pressure conduit extending in proximity to the charging and discharging means, valves for venting the said air pressure conduit and arranged respectively in proximity to the said charging and discharging means, connections for automatically opening the said valves to vent the said conduit through the obstruction of the movement of the charging mechanism and then through obstruction of the movement of the conveyor and of the discharging means, and resetting means for each of said valves.

20. In an apparatus of the character described, the combination, with a conveyor comprising a plurality of transversely extending bottle carriers, of a second conveyor extending transversely with respect to and in front of the first mentioned conveyor, means for delivering bottles in successive series from the second conveyor to the bottle carriers of the first conveyor, a bottle receiving and delivering rack at the rear of the said apparatus adapted to receive successive series of bottles from the carriers on said conveyor, means for driving the first mentioned conveyor, means operated by such conveyor-driving mechanism for operating the bottle-delivering means and the said delivery rack, and means for automatically suspending the operation of the main conveyor driving mechanism by an obstruction of the bottle delivering means and by the engagement with said delivery rack of a bottle carried by the first conveyor.

JOHN R. GRUETTER.